United States Patent
Aiello et al.

(10) Patent No.: US 7,484,038 B1
(45) Date of Patent: Jan. 27, 2009

(54) METHOD AND APPARATUS TO MANAGE STORAGE DEVICES

(75) Inventors: Anthony F. Aiello, Santa Clara, CA (US); Robert W. Horst, San Jose, CA (US); Robert L. Weisickle, Granite Bay, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 345 days.

(21) Appl. No.: 11/078,832

(22) Filed: Mar. 11, 2005

Related U.S. Application Data

(60) Provisional application No. 60/647,672, filed on Jan. 26, 2005.

(51) Int. Cl.
  *G06F 12/00* (2006.01)
  *G06F 13/00* (2006.01)
  *G06F 13/28* (2006.01)
(52) U.S. Cl. .................................................. 711/114
(58) Field of Classification Search ................ 711/114
  See application file for complete search history.

(56) References Cited

U.S. PATENT DOCUMENTS

| | | | |
|---|---|---|---|
| 5,568,629 A | | 10/1996 | Gentry et al. |
| 5,666,512 A | * | 9/1997 | Nelson et al. ............... 711/114 |
| 6,526,478 B1 | * | 2/2003 | Kirby .......................... 711/114 |
| 6,766,430 B2 | * | 7/2004 | Arakawa et al. ............. 711/165 |
| 6,874,061 B1 | * | 3/2005 | Bridge ........................ 711/114 |
| 2002/0010762 A1 | * | 1/2002 | Kodama ..................... 709/219 |
| 2002/0112113 A1 | * | 8/2002 | Karpoff et al. ................ 711/4 |
| 2002/0129048 A1 | * | 9/2002 | Qiu et al. .................... 707/204 |
| 2006/0143503 A1 | * | 6/2006 | Shaik et al. .................... 714/6 |

* cited by examiner

*Primary Examiner*—Matt Kim
*Assistant Examiner*—Edward J Dudek
(74) *Attorney, Agent, or Firm*—Blakely, Sokoloff, Taylor & Zafman LLP.

(57) ABSTRACT

A method and apparatus to manage storage devices has been disclosed. In one embodiment, the method includes logically partitioning each of a number of storage devices in a networked data storage system into segments and managing the segments in response to how often each of the storage devices is accessed. Other embodiments are described and claimed.

15 Claims, 9 Drawing Sheets

METHOD AND APPARATUS TO MANAGE STORAGE DEVICES

This application claims the benefit of U.S. provisional patent application No. 60/647,672, filed on Jan. 26, 2005, and entitled, "A Method and Apparatus to Manage Storage Devices," which is incorporated herein by reference.

FIELD OF INVENTION

The present invention relates to networked storage systems, and more particularly, to managing storage devices in a networked storage system.

BACKGROUND

A networked storage system may include a number of storage servers, which may be implemented in the form of storage appliances. A storage server may provide file services related to the organization of data on storage devices, such as disks. Such a storage server is commonly referred to as a file server or a filer. An example of such a storage server is any of the filer products made by Network Appliance, Inc. in Sunnyvale, Calif. The storage server may be implemented with a special-purpose computer or a general-purpose computer. The storage server is typically coupled to a number of storage devices, such as disks, to store or to retrieve data on the storage devices.

In a conventional system, the storage server directly manages the storage devices. For example, the storage server is responsible for scheduling operations on the storage devices, laying out data on the storage devices, and collecting storage device Input/Output (I/O) operations. Each of the storage devices is treated as a single unit, and thus, the storage server maps or allocates an entire storage device as a single logical unit.

However, the conventional way to manage storage devices is unsatisfactory for at least a number of reasons. First, the I/O requests may be concentrated on a particular storage device, which is commonly referred to as a "hot disk" if the storage device is a disk. The disproportionate number of I/O requests may overburden the hot disk while leaving other storage devices underused. However, the existing storage server does not take advantage of the I/O processors (IOPS) on other storage devices besides the hot disk. Furthermore, since each entire storage device is a single logical unit, I/O operations to access the data of the logical unit are not directed to multiple storage devices. Thus, I/O operations are not directed to storage devices that are lightly used. Moreover, when a portion of a storage device fails, the entire storage device becomes unusable because the storage server does not partition the failed portion from the rest of the storage device.

In a particular system, the storage devices may be arranged into Redundant Array of Independent Disks (RAID) groups or volumes. Each RAID group includes a predetermined number of storage devices. As the size of each storage device grows, the size of the RAID group increases as well, even though the RAID group may not require more storage space. Consequently, some of the storage space in the storage devices in the RAID group is wasted because the existing storage server does not partition a storage device to assign the extra space for other uses.

SUMMARY

The present invention includes a method and apparatus to manage storage devices in a networked storage system. In one embodiment, the method includes logically partitioning each of a number of storage devices in a networked data storage system into segments and managing the segments in response to how often each of the storage devices is accessed.

In a specific embodiment of the present invention, the managing of the pluralities of segments includes mapping the segments into a number of logical units.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1A:
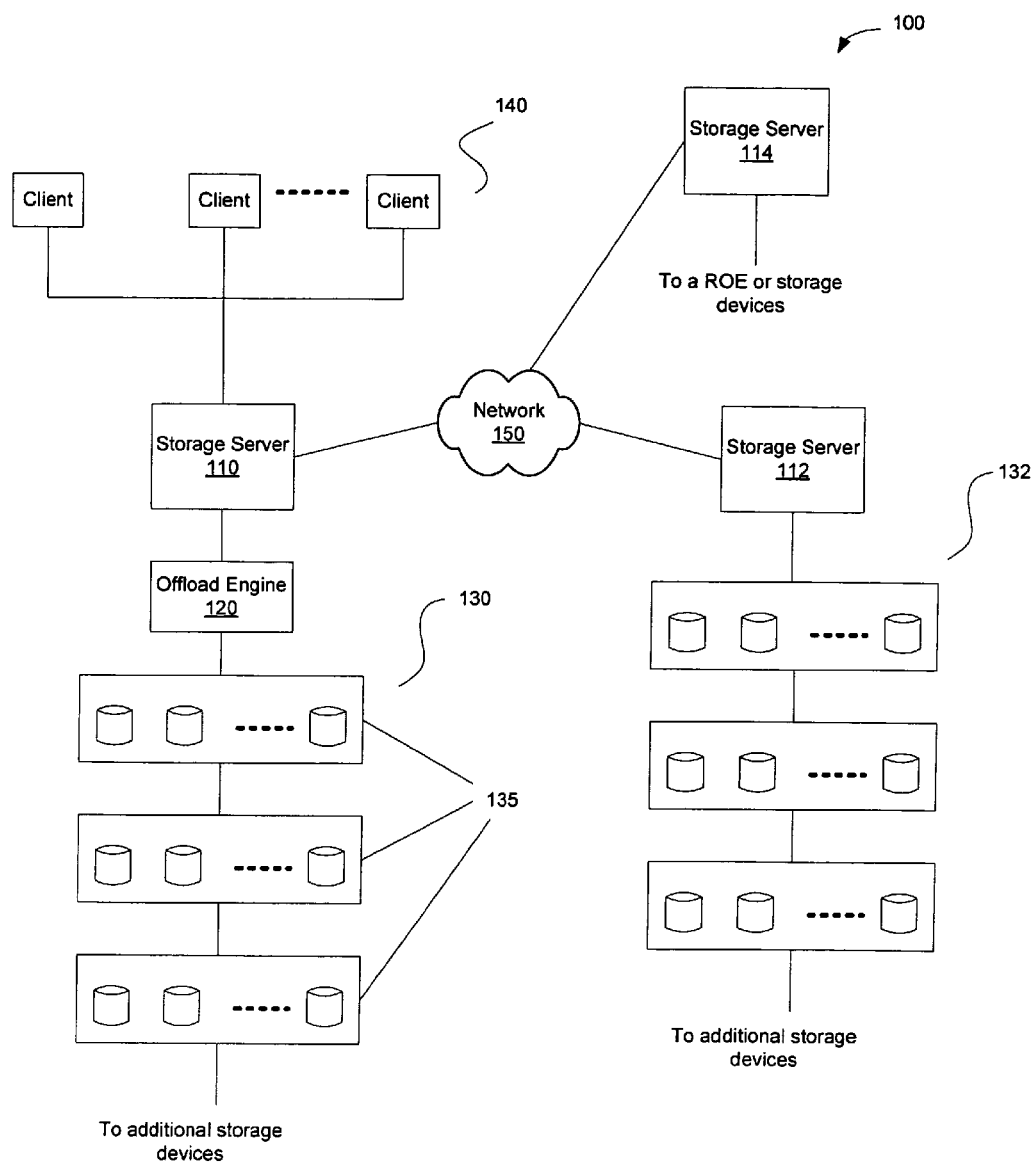
FIG. 1A illustrates an exemplary embodiment of a networked storage system.

A method and apparatus to manage storage devices in a networked storage system are described. In the following description, numerous specific details are set forth. However, it is understood that embodiments of the invention may be practiced without these specific details. In other instances, well-known components, structures, and techniques have not been shown in detail in order not to obscure the understanding of this description.

Some portions of the following detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes ROM; RAM; magnetic disk storage media; optical storage media; flash memory devices; electrical, optical, acoustical or other form of propagated signals (e.g., carrier waves, infrared signals, digital signals, etc.); etc.

FIG. 1A illustrates an exemplary embodiment of a networked storage system 100. The system 100 includes a number of storage servers 110, 112, and 114, an offload engine 120, a number of client machines 140, a network 150, and two sets of storage devices 130 and 132.

In one embodiment, the system 100 includes a storage area network (SAN) to transmit read/write requests at the block level between the storage servers 110, 112, and 114. A block is the basic unit used to store data in the SAN. In an alternative embodiment, the system 100 could be a network attached storage (NAS) system that transmits data to clients at the file level. In another embodiment, the system 100 could be directly attached to the pool of storage devices it manages.

Note that any or all of the components of system 100 and associated hardware may be used in various embodiments of the present invention. However, it can be appreciated that other configurations of the networked storage system may include some or all of the devices disclosed above.

Referring to FIG. 1A, the storage servers 110, 112, and 114 may include file servers. The storage servers 110, 112, and 114 are coupled to each other via the network 150. The network 150 may include a wide area network (WAN), a local area network (LAN), etc. The storage server 110 is also coupled to the client machines 140 and the offload engine 120. The offload engine 120 is further coupled to the storage devices 130. Alternatively, a storage server can be directly coupled to storage devices. For instance, the storage server 112 is coupled to the storage devices 132 without going through an offload engine. The storage devices 130 and 132 may include disks. In one embodiment, the storage devices 130 and 132 are coupled to the offload engine 120 and the storage server 112, respectively, via Fibre Channel links. The Fibre Channel links may adopt the Internet Small Computer System Interface (iSCSI) protocol for data transfer. Alternatively, the storage devices 130 and 132 are coupled to the offload engine 120 and the storage server 112, respectively, via Ethernet links.

Each of the storage devices 130 and 132 is logically partitioned into a number of segments. A segment may be defined as some contiguous blocks, area, or region of a storage device. The storage devices 130 and 132 may be arranged into a number of shelves 135. Furthermore, the storage devices may also be organized into RAID volumes.

The storage devices 130 and 132 are managed in the granularity of segments, as opposed to the granularity of storage devices in the existing systems. It should be appreciated that segment management tasks may be performed by a storage server (e.g., the storage server 112) or an offload engine (e.g., the offload engine 120) coupled between a storage server and the storage devices. Details of the storage server and the offload engine are discussed below.

To manage the storage devices 130, segments of each of the storage devices 130 are mapped to logical units (e.g., files) when the logical units are instantiated. The logical units may be instantiated in response to requests storage servers 110-114. The mapping of segments to the logical units depends on the predetermined specification of the logical units, such as the storage space, the number of IOPS, and the speed of the logical units. Furthermore, segments of a single or multiple storage devices may be mapped to the logical units.

In addition to mapping the segments to the logical units, a mirroring relationship between two or more segments may be created by allocating segments from two different storage devices at the time of creation. The segments in a given mirror pair preferably are selected from two physically different storage devices.

Figure 1B:
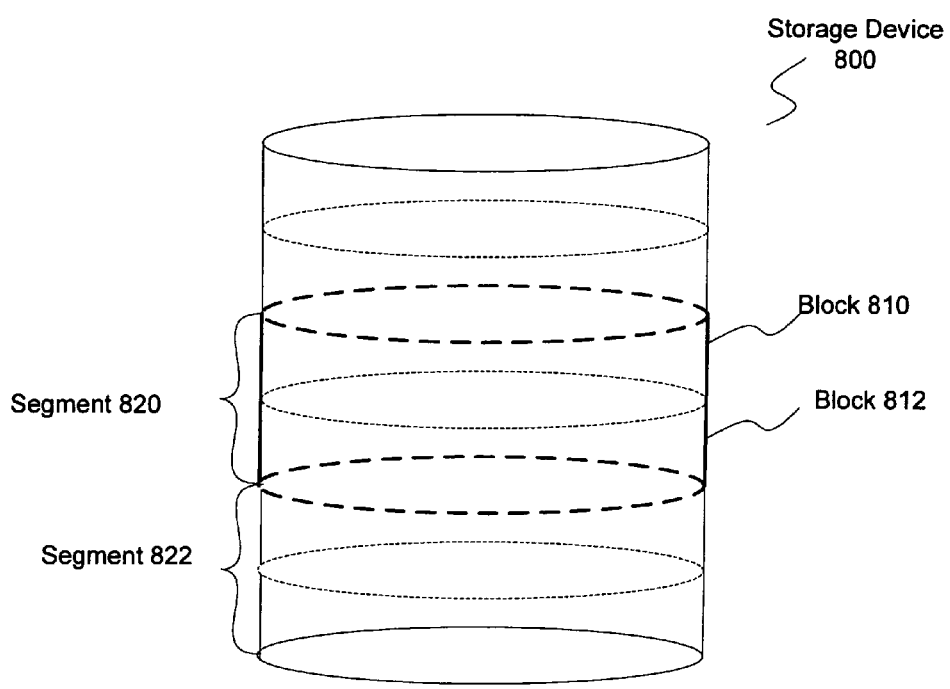
FIG. 1B illustrates an exemplary embodiment of a storage device.

FIG. 1B illustrates an exemplary embodiment of a storage device, such as a disk, in a networked storage system. The storage device 800 includes a number of blocks, such as the blocks 810 and 812. A segment in the storage device 800 is defined to be a contiguous range of blocks in the storage device 800. For instance, the segment 820 includes the two consecutive blocks 810 and 812 in the storage device 800. In an alternate embodiment, a segment may include a different number of blocks, such as one, three, four, etc. The segments 820 and 822 may be mapped to different logical units. A segment 820 or 822 can be mirrored to a segment on another storage device. To maintain the mirror, one segment in a mirror pair is updated with changes in the data of the segment.

Figure 2:
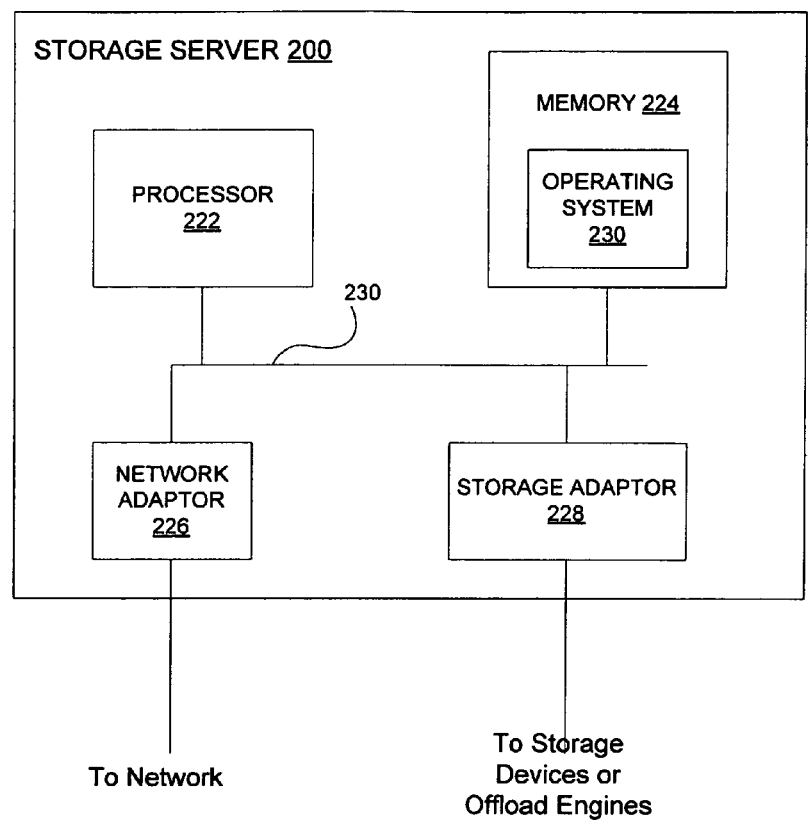
FIG. 2 illustrates one embodiment of a storage server.

FIG. 2 illustrates one embodiment of a storage server in a networked storage system. The storage server 200 includes a processor 222, a memory 224, a network adapter 226, and a storage adapter 228, which are coupled to each other via a bus 230. In one embodiment, the storage server 200 is within a network and the network adapter 226 interfaces with the network. The network may include a LAN, a WAN, etc. Data is transmitted between the storage server 200 and the network via the network adapter 226. When the data is received, the network adapter 226 may forward the data to the storage adapter 228, the memory 224, and/or the processor 222.

In one embodiment, the processor 222 reads instructions from the memory 224 and executes the instructions. The memory 224 may include any of various types of memory devices, such as, for example, random access memory (RAM), read-only memory (ROM), flash memory, one or more mass storage devices (e.g., disks), etc. Furthermore, the memory 224 may store an operating system 230 in which the processor 222 operates with. The processor 222 responds to requests from client machines or other storage servers and organizes data on storage devices in the system. The storage devices are coupled to the storage server 200 directly or via one or more offload engines (not shown). The storage server 200 interfaces with the offload engine(s) or the storage devices via the storage adapter 228. The storage devices may include a number of disks, which may be organized into RAID volumes and the offload engines may include a RAID Offload Engine (ROE).

As discussed above, the storage devices are logically partitioned into segments. The processor 222 of the storage server 200 may perform various operations to manage the segments (e.g., mapping the segments to logical units, mirroring a segment to another segment, etc.). Alternatively, the storage server 200 may offload the segment management tasks to an offload engine coupled between the storage devices and the storage adapter 228.

Figure 3:
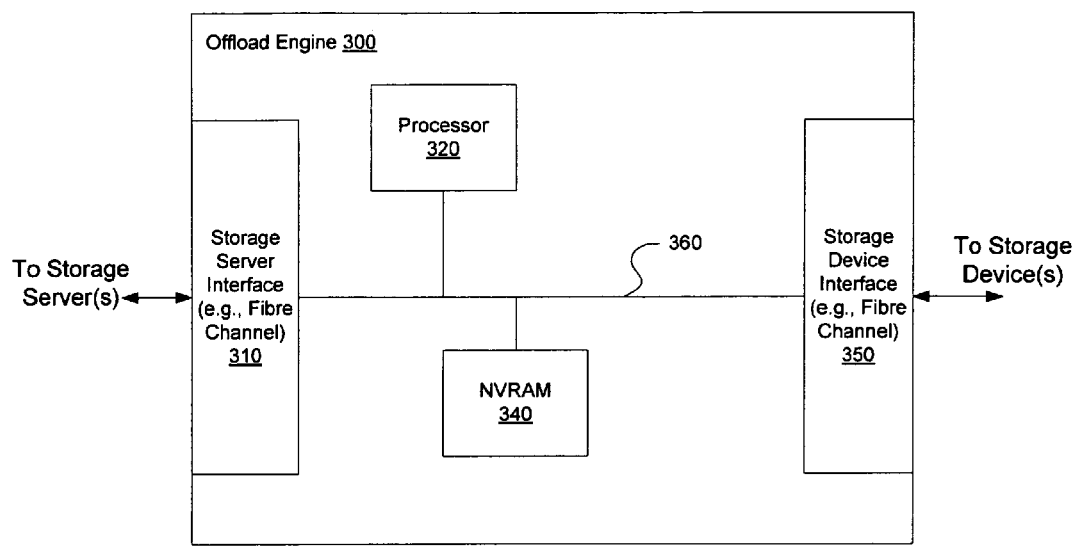
FIG. 3 illustrates one embodiment of an offload engine.

FIG. 3 shows one embodiment of an offload engine. The offload engine 300 includes a storage server interface 310, a processor 320, bus 360, and a storage device interface 350. The offload engine 300 may also include some form of non-volatile memory 340 (e.g., a non-volatile RAM), as shown. The storage server interface 310, the processor 320, the non-volatile storage device 340, and the storage device interface 350 are coupled to each other via the bus 360. The storage server interface 310 couples the offload engine 300 to a number of storage servers (e.g., file servers) in a networked storage system. Likewise, the storage device interface 350 couples the offload engine 300 to a number of storage devices, such as disks. The disks may be organized into a number of RAID volumes.

Referring to FIG. 3, the storage device interface 350 receives requests from the storage servers to perform operations, such as mapping segments to logical units, calculating checksum, etc. The requests are forwarded to the processor 320, which parses the requests and performs the requested operations. Some of the operations involve sending requests to the storage devices via the storage device interface 350. The offload engine 300 may send the information on the states of the operations performed to the corresponding storage servers. Alternatively, the offload engine 300 may store the states in the non-volatile storage device 340. Storing the states in the non-volatile storage device 340 enables the offload engine 300 to support consistency across operations. Furthermore, the non-volatile storage device 340 may store a storage system log, which can be used to recover the offload engine 300 in the event of a system failure.

Figure 4:
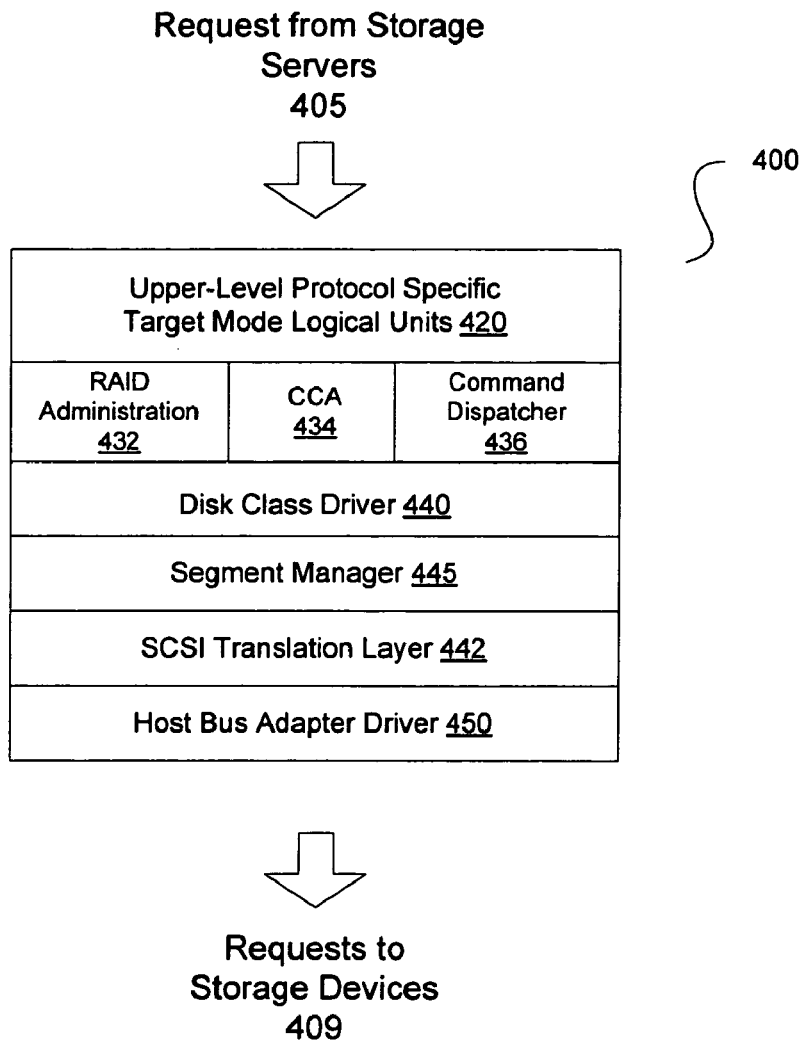
FIG. 4 illustrates a logical representation of one embodiment of an offload engine.

FIG. 4 illustrates a logical representation of the software stack in one embodiment of an offload engine usable in a networked storage system. The offload engine 400 serves as an intermediary between a number of storage servers and a number of storage devices. The storage devices may be organized into RAID volumes. Therefore, the offload engine 400 may also be referred to as a RAID Offload Engine (ROE). However, it should be appreciated that the concept described below is applicable to other embodiments of an offload engine that are coupled to storage devices in other arrangement or configuration.

The ROE 400 in the illustrated embodiment includes an upper-level protocol translation layer 420, which receives read and write requests 405 from storage servers and implements any one or more of various different protocols, such as NFS, CIFS, SCSI, etc. Logically below the upper-level protocol translation layer, ROE 400 includes a RAID Administrator 432; a Configuration and Control Administrator (CCA) 434; a Command Dispatcher 436 for dispatching disk I/O commands in SAN target mode; a disk class driver 440; Segment Manager 445; a SCSI translation layer 442; and a host bus adapter (HBA) driver 450.

The ROE 400 receives requests 405 from the storage servers. In response to the requests 405, the RAID administrator 432 may perform RAID operations and/or send requests 409 to storage devices (e.g., disks) in the system. RAID administrator 432, CCA 434 and Command Dispatcher 436 may be collectively referred to as Upper Level Administrators (ULAs). The CCA 434 is to define the configuration of the storage devices (e.g., disks) coupled to the ROE 400. The CCA 434 may further be responsible for assigning logical units (formed from segments collected by the Segment Manager 445) into RAID groups, etc.

The Command Dispatcher 436, which implements SCSI in certain embodiments, is a distribution point for transactions between the storage servers and the storage devices coupled to the ROE 400. The Command Dispatcher 436 parses commands from the storage servers to determine where to route the commands.

As discussed above, the ULAs include RAID Administrator 432, also referred to as the RAID execution engine. The RAID Administrator 432 handles the operations related to the implementation of RAID functions and/or other SCSI operations. The RAID operations may include checksum validation, RAID parity consistency checks, and storage device media verification.

The ULAs may also include an Enclosure Administrator (EA) (not shown), which is also referred to as the enclosure clearing-house. As discussed above, the storage devices coupled to the ROE 400 may include disks organized into shelves. Each shelf may include an enclosure server. The EA communicates with the enclosure servers and forwards the enclosure events for the shelves.

One should appreciate that the various layers of the ROE 400 may or may not be implemented as separate tasks. In one embodiment, these layers 410-455 include direct callable layers, table indirect driven callable interface, and/or separate tasks communicating by signals or messages.

In one embodiment, the Segment Manager 445 performs operations to manage the storage devices by segments. The Segment Manager 445 may logically partition the storage devices into segments. In response to a request to instantiate a logical unit, the Segment Manager 445 may map one or more segments to the logical unit. The segments can be from a single storage device or multiple storage devices. The Segment Manager 445 may map the segments to the logical units based on how often the storage devices are used. Furthermore, the Segment Manager 445 may monitor the usage of the storage devices. As the usage of the storage devices changes, the Segment Manager 445 may modify the mapping of the segments to divert I/O requests from a hot disk to one or more less used storage devices. Likewise, in response to how often the data of the logical units is accessed, the Segment Manager 445 may modify the mapping of the segments accordingly. For example, the Segment Manager 445 may store the more frequently accessed data in a segment of a faster storage device in order to speed up data access. The Segment Manager 445 may create logical units from mirror-pair segments. In this that case two or more storage devices shall have segments allocated from them to create the mirror set. Mirrored sets' properties include all properties of non-mirrored segments and additionally provide redundancy of data as well as the capability to read from either at any time.

In addition to mapping segments, the Segment Manager 445 may support disaster recovery by mirroring the segments. For example, the Segment Manager 445 may mirror a first segment to a second segment by copying the data from the first segment to the second segment, or at the time of instantiation, creating a mirror segment-set. The first and second segments are stored in separate storage devices to ensure that loss of a storage device does not compromise the integrity of the logical unit. To maintain the mirroring relationship, the Segment Manager 445 mirrors write operations between the two segments and will share the read load between the storage devices containing the segments. If the first segment fails, the Segment Manager 445 may recover the data by replacing the first segment with the second segment. Since the second segment is a mirror image of the first segment, the Segment Manager 445 can simply update the mapping of the segments that compose the logical unit. Moreover, since the storage device is logically partitioned into segments and is managed in the granularity of segments, unlike the existing scheme, in which a disk is managed as a single unit, failure of a single segment in the storage device does not necessarily render the entire storage device unusable.

Furthermore, in response to a request to instantiate a logical unit, the Segment Manager 445 may break a mirroring relationship between the first and second segments and map the second segment to the logical unit if there is no free segment available in the system. More details of segment management are discussed below with reference to FIGS. 5-7.

Figure 5:
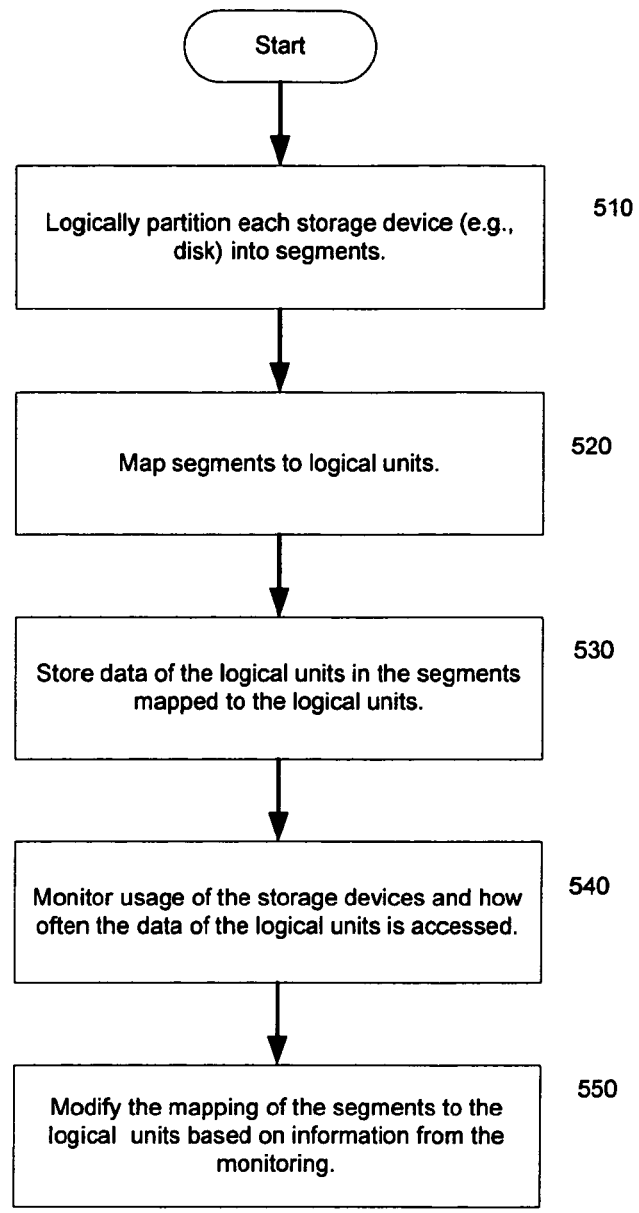
FIG. 5 is a flow diagram showing a process for managing storage devices in a networked storage system.

FIG. 5 shows a flow diagram of one embodiment of a process, which may be performed by the ROE 400, for managing segments of storage devices in a networked storage system. The process is performed by processing logic, which may comprise hardware, including general-purpose computers, dedicated circuitry, and/or machines (e.g., the storage server 112 or the offload engine 120), software (such as the software running on the offload engine 400 to implement the Segment Manager 445), or a combination of both.

Processing logic partitions each storage device (e.g., disk) logically into segments (processing block 510). A segment shall include a contiguous range of blocks in the storage device. Processing logic then maps the segments to one storage device to instantiate the logical units (processing block 520). The mapping of segments may be performed in response to requests from storage servers. After mapping the segments to the logical units, processing logic stores data of the logical units in the corresponding segments (processing block 530). Processing logic monitors the usage of the storage devices and how often the data of the logical units is accessed (processing block 540), and in response to which, processing logic may modify the segment mapping to improve the efficiency of the system (processing block 550). For example, processing logic may store the more frequently accessed data in a segment of a faster storage device.

Figure 6A:
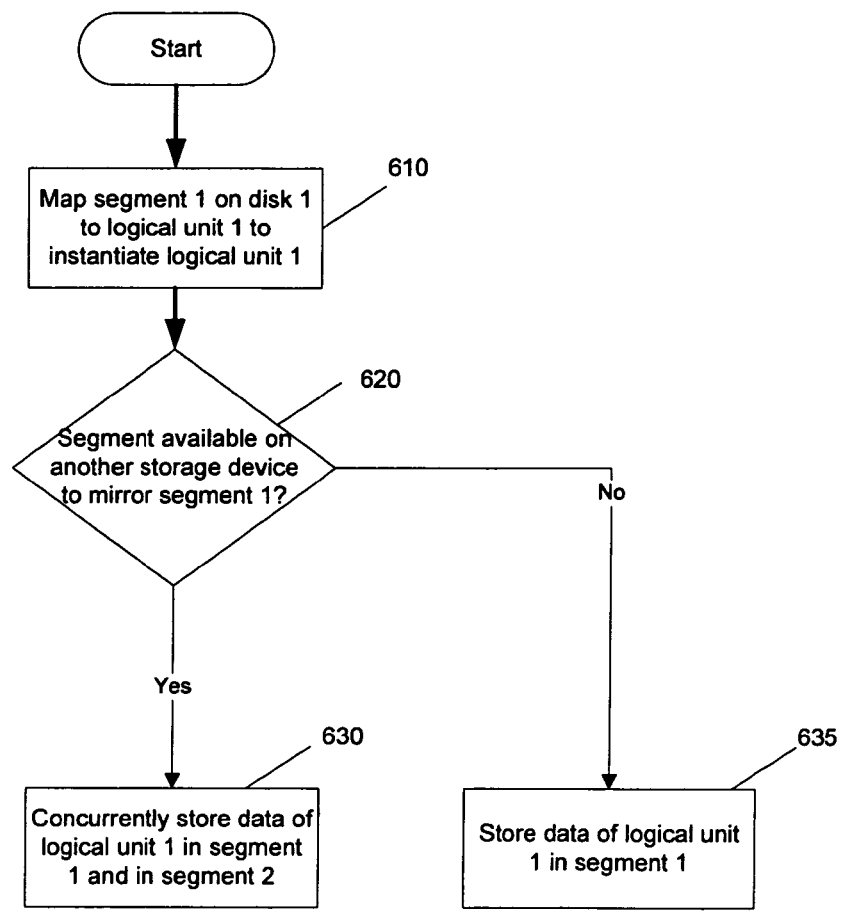
FIG. 6A is a flow diagram of a process for assigning segments and establishing a mirror pair.

FIG. 6A shows a flow diagram of one embodiment of a process, which may be performed by the ROE 400, for assigning segments and establishing a mirror pair. The process is performed by processing logic, which may comprise hardware, including general-purpose computers, dedicated circuitry, and/or machines (e.g., the storage server 112 or the offload engine 120), software (such as the software running on the offload engine 400 to implement the Segment Manager 445), or a combination of both.

Referring to FIG. 6A, processing logic maps a first segment (segment 1) on a first disk to a first logical unit (logical unit 1) to instantiate the first logical unit (processing block 610). Then processing logic determines whether a segment is available to mirror segment 1 as a second segment (segment 2) on a second shall be from different storage devices to insure that loss of a single storage device does not affect the integrity of the logical unit (processing block 620). If a segment is available for this purpose, then the processing logic concurrently stores segments 1 and 2 on disk (processing block 630). Otherwise, the processing logic only stores segment 1 on disk (processing block 635).

Figure 6B:
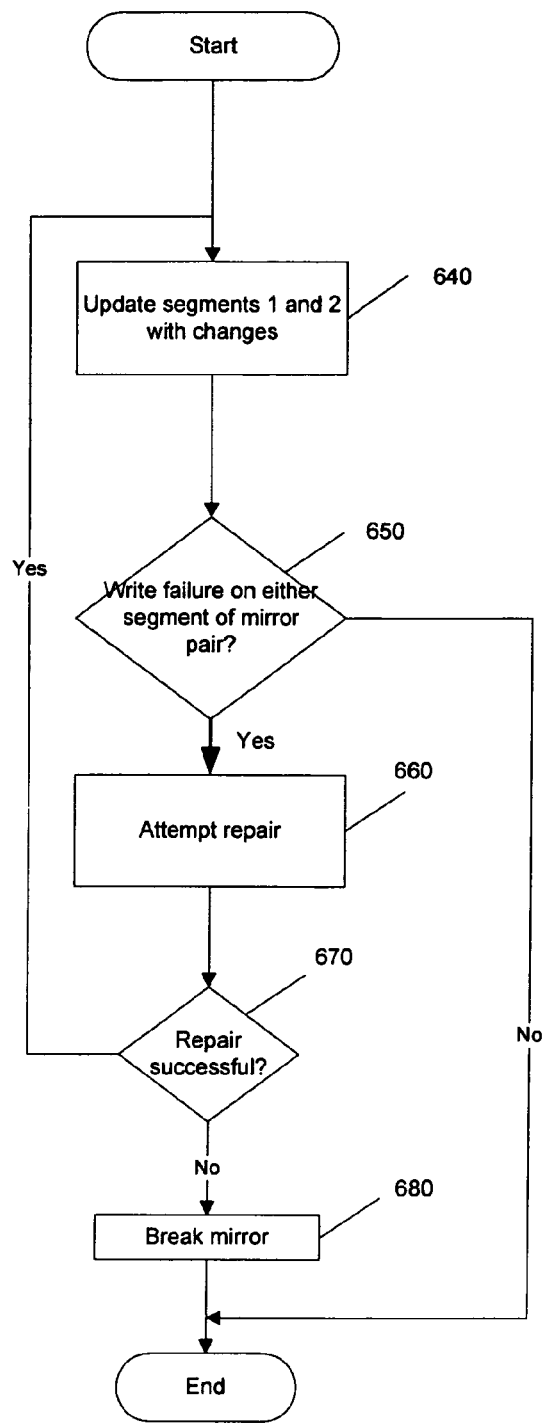
FIG. 6B is a flow diagram of a process for updating a mirrored pair of segments in response to a write request that affects the mirrored pair.

FIG. 6B shows a process, which may be performed by the ROE 400, for updating a mirrored pair of segments. The process may be performed in response to a write request that affects the mirrored pair. To maintain the mirroring relationship, processing logic attempts to update both segments of the mirror pair with changes of the data (processing block 640). If there is a failure to write to either segment of the mirror pair (processing block 650), a repair of the affected storage device is attempted (processing block 660). If the repair is successful (processing block 670), the write is retried (processing block 640). If the repair is not successful, the Segment Manager 445 breaks the mirror (processing block 680), leaving the surviving segment (the segment which was written successfully) as the only valid segment for the logical unit.

Figure 7:
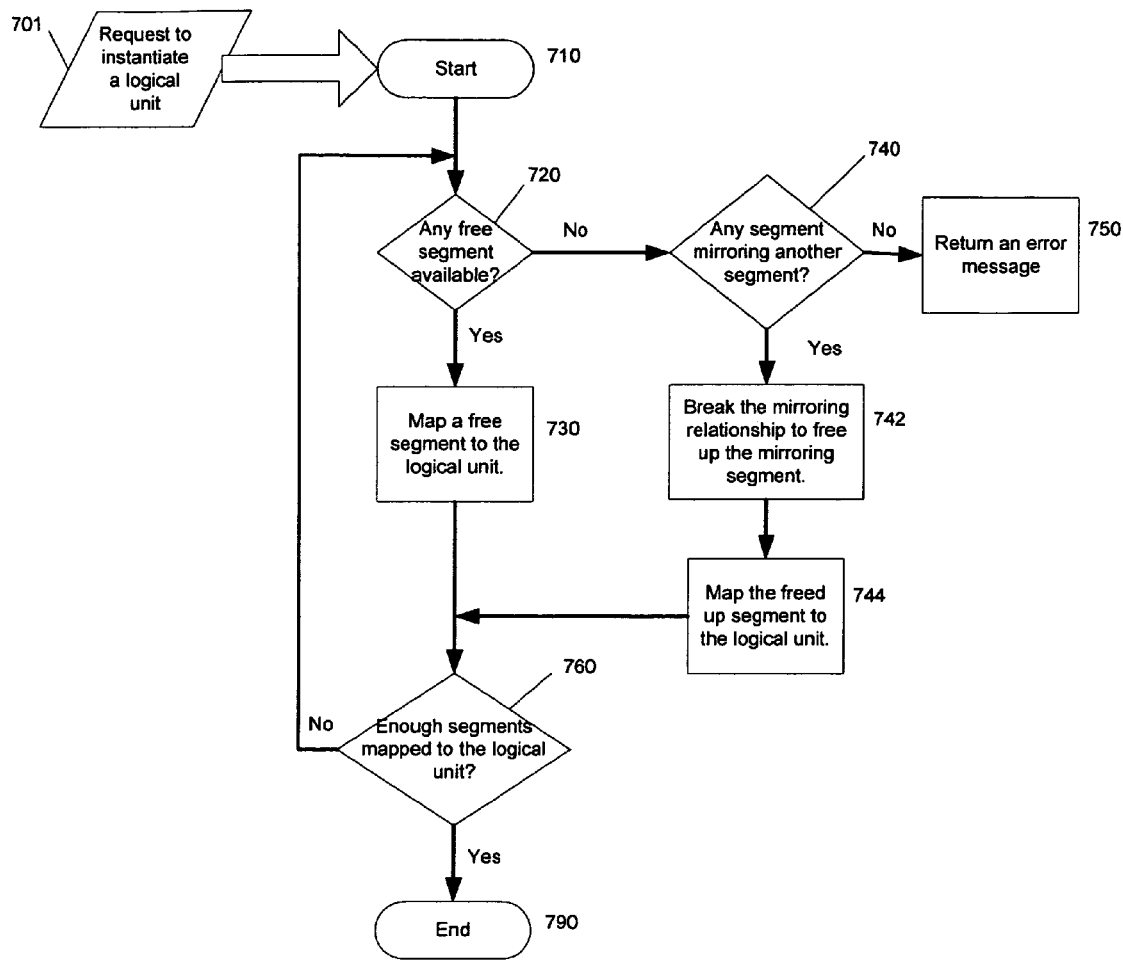
FIG. 7 is a flow diagram of a process for managing segments of storage devices in a networked storage system.

FIG. 7 shows a flow diagram of another aspect of the process for managing segments of storage devices in a networked storage system. The process is performed by processing logic, which may comprise hardware, including general-purpose computers, dedicated circuitry, and/or machines (e.g., the storage server 112 or the offload engine 120), software (such as the software running on the offload engine 400 to implement the Segment Manager 445), or a combination of both.

Referring to FIG. 7, in response to a request 701 to instantiate a logical unit, processing logic starts the process (processing block 710). The request 701 may be from a storage server or a client machine in the system. Processing logic checks whether there is any free segment available (processing block 720). If there is a free segment, processing logic maps the free segment to the logical unit (processing block 730). If there are multiple free segments available, processing logic may choose one of the free segments based on a variety of factors, such as the storage space, the number of IOPS, and the speed of the storage devices containing the free segments.

If there is no free segment, processing logic checks whether there is any segment mirroring another segment in the system (processing block 740). If there is none, processing logic returns an error message because the logical unit is not instantiated due to insufficient segments (processing block 750). If there is a segment mirroring another segment, processing logic breaks the mirroring relationship of that pair to free up a segment (processing block 742) and maps the freed up segment to the logical unit (processing block 744).

Once a segment has been mapped to the logical unit, processing logic determines whether enough segment(s) have been mapped to the logical unit (processing block 760). If there have been enough segments mapped, then processing ends (processing block 790). If processing logic determines that at least one more segment has to be mapped to the logical unit, processing logic returns to the processing block 720 to find an available segment to map to the logical unit. The process ends when enough segments have been mapped to the logical unit or the system runs out of segments.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
    logically partitioning each of a plurality of storage devices in a networked data storage system into a plurality of segments, at least a first one of the plurality of segments having a different size than a second one of the plurality of segments, wherein each segment is a contiguous range of blocks on a storage device of the plurality of storage devices, the contiguous range of blocks including fewer than all of the blocks on the storage device;
    mapping the plurality of segments to a plurality of logical units, the mapping including mapping a first segment of a first storage device to a logical unit, and mirroring the first segment to a second segment of a second storage device, wherein the first and second segments are a mirrored set;
    in response to a request to instantiate a logical unit, if no free segment is available for the logical unit, breaking a mirroring relationship for the mirrored set to remove redundancy associated with the first segment and assigning the second segment to the logical unit;
    monitoring, at a storage server, usage of the plurality of storage devices, wherein said monitoring does not require the use of any monitoring application that is external to the storage server; and
    managing the plurality of segments at the storage server in response to how often each of the plurality of storage devices is accessed.

2. The method of claim 1, wherein managing the plurality of segments further comprises:
    storing data of the plurality of logical units in the plurality of segments;
    monitoring usage of the plurality of storage devices; and
    modifying the mapping of the plurality of segments into the plurality of logical units in response to how often the data of the plurality of logical units is accessed and how often each of the plurality of storage devices is used.

3. The method of claim 1, wherein the plurality of storage devices comprise a plurality of disks.

4. The method of claim 1, wherein the mirroring comprises mirroring write operations to the mirrored set and sharing read load between the members of the mirrored set.

5. The method of claim 4, further comprising invalidating the mapping of a mirrored set segment in response to a failure to correctly record data on a corresponding storage device.

6. An apparatus comprising:
    a network adapter coupled to a plurality of clients via a network;
    a storage adapter coupled to a plurality of storage devices logically partitioned into a plurality of segments, at least a first one of the plurality of segments having a different size than a second one of the plurality of segments, wherein each segment is a contiguous range of blocks on a storage device, the contiguous range of blocks including fewer than all of the blocks on the storage device;
    a processor to map a first subset of the plurality of segments to a plurality of logical units in response to a plurality of requests to instantiate the plurality of logical units, to mirror the first subset of the plurality of segments to a second subset of the plurality of segments, wherein the first and second segments are a mirrored set, to receive a request to instantiate a logical unit, to break a mirroring relationship for the mirrored set to remove redundancy associated with the first segment and assign the second segment to the logical unit if no free segment is available for the logical unit, to store data of the plurality of logical units in the plurality of segments, to monitor usage of the plurality of storage devices without using any monitoring application that is external to the apparatus, and to modify the map of the plurality of segments to the plurality of logical units in response to how often each of the storage devices is detected to be used; and
    a bus to couple the processor to the storage adapter and to the network adapter.

7. The apparatus of claim 6, further comprising a host bus adapter coupled to the bus to receive the plurality of requests from the storage server.

8. The apparatus of claim 6, wherein the processor maps the plurality of segments to the plurality of logical units based on speed of the storage devices and how often each of the plurality of storage devices is used.

9. A networked data storage system comprising:
    a plurality of storage devices to provide storage to a plurality of clients, each of the plurality of storage devices being logically partitioned into a plurality of segments;
    a storage server, coupled to the plurality of clients, to receive commands from the plurality of clients, and to direct an offload engine to perform a plurality of operations; and
    the offload engine, coupled to the plurality of storage devices and to the storage server, to act as an intermediary between the storage server and the plurality of storage devices, the offload engine to perform the plurality of operations in response to direction from the storage server, the offload engine including a segment manager to map a segment of a storage device to a logical unit in response to a request to instantiate the logical unit, to monitor usage of the plurality of storage devices without use of a monitoring application that is external to the offload engine, and to remap the segment of the storage device to a different logical unit in response to the usage of the plurality of storage devices.

10. The networked data storage system of claim 9, further comprising the storage server, coupled to the offload engine and to the plurality of clients, to request to instantiate the logical unit.

11. The networked data storage system of claim 10, wherein the plurality of storage devices comprise a plurality of Redundant Array of Independent Disks (RAID) volumes, the offload engine comprises a RAID Offload Engine (ROE), and the plurality of operations comprise parity calculation.

12. A method comprising:
    logically partitioning each of a first plurality of storage devices in a networked data storage system into a plurality of segments, wherein each segment is a contiguous range of blocks on a storage device of the first plurality of storage devices, the contiguous range of blocks including fewer than all of the blocks on the storage device, at least a first one of the plurality of segments having a different size than a second one of the plurality of segments;
    mapping the plurality of segments to a plurality of logical units based on the speed of the first plurality of storage devices and how often the first plurality of storage devices are accessed;
    storing data of the plurality of logical units in the plurality of segments;
    monitoring usage of the first plurality of storage devices by a segment manager that operates on an offload engine, wherein the offload engine acts as an intermediary between a plurality of storage servers and the first plurality of storage devices, and wherein the offload engine performs a plurality of operations in response to direction from the plurality of storage servers;

modifying the mapping of the plurality of segments to the plurality of logical units in response to how often the data of the plurality of logical units is accessed; and mirroring the plurality of segments of the first plurality of storage devices to segments of a second plurality of storage devices in the networked data storage system.

13. A method comprising:

logically partitioning each of a plurality of storage devices in a networked data storage system into a plurality of segments, wherein each segment is a contiguous range of blocks on a storage device of the plurality of storage devices, the contiguous range of blocks including fewer than all of the blocks on the storage device;

mapping the plurality of segments to a plurality of logical units, the mapping including mapping a first segment of a first storage device to a logical unit and mirroring the first segment to a second segment of a second storage device, wherein the first and second segments are a mirrored set;

storing data of the plurality of logical units in the plurality of segments;

in response to a request to instantiate a logical unit, if no free segment is available for the logical unit, breaking a mirroring relationship for the mirrored set to remove redundancy associated with the first segment and assigning the second segment to the logical unit;

monitoring usage of the plurality of storage devices by a storage server that provides storage to a plurality of clients to determine how often the data of the plurality of logical units is accessed and how often each of the plurality of storage devices is used, wherein said monitoring does not require the use of any monitoring application that is external to the storage server; and modifying the mapping of the plurality of segments into the plurality of logical units by the storage server in response to how often the data of the plurality of logical units is accessed and how often each of the plurality of storage devices is used.

14. The networked data storage system of claim 9, wherein the storage server includes a plurality of storage servers, each of which directs the offload engine to perform the plurality of operations.

15. The networked data storage system of claim 9, further comprising:

a non-volatile storage device coupled to the offload engine;

the offload engine to store information on states of the plurality of operations in the non-volatile storage device to support consistency across operations, to store a storage system log in the non-volatile storage device, and to use the storage system log to recover from a system failure.

* * * * *